United States Patent
Coppolo

[11] Patent Number: 5,823,581
[45] Date of Patent: Oct. 20, 1998

[54] PIPE COUPLING

[76] Inventor: Guy Coppolo, Box 257, Cataumet, Mass. 02534-0257

[21] Appl. No.: 806,567

[22] Filed: Feb. 25, 1997

Related U.S. Application Data

[60] Provisional application No. 60/013,028 Mar. 8, 1996.

[51] Int. Cl.$^6$ ...................................................... F16L 47/06
[52] U.S. Cl. ........................ 285/373; 785/419; 785/915; 785/423
[58] Field of Search ..................... 285/419, 373, 285/372, 423, 915, 418, 417

[56] References Cited

U.S. PATENT DOCUMENTS

| | | | |
|---|---|---|---|
| 5,007,666 | 4/1991 | Kyfes | 285/419 |
| 5,462,312 | 10/1995 | Carpenter et al. | 285/419 |

FOREIGN PATENT DOCUMENTS

| | | | |
|---|---|---|---|
| 1387002 | 12/1964 | France | 285/419 |
| 1449044 | 7/1966 | France | 285/419 |
| 692657 | 6/1940 | Germany | 285/419 |
| 19161 | 4/1909 | United Kingdom | 285/419 |

*Primary Examiner*—Eric K. Nicholson
*Attorney, Agent, or Firm*—Brian M. Dingman

[57] ABSTRACT

A simple and inexpensive pipe coupling comprising a first sleeve, made up of two or more partial-sleeves which together when fixed in position form the first pipe-like sleeve around and proximate to an underlying uncoupled pipe, and a second sleeve, made up of two or more partial-sleeves which together when fixed in position form the second pipe-like sleeve around and proximate to the underlying first pipe-like sleeve.

14 Claims, 6 Drawing Sheets

PIPE COUPLING

RELATED APPLICATION

This application is a continuation in part of provisional application Ser. No. 60/013,028, filed Mar. 8, 1996.

FIELD OF THE INVENTION

This invention relates to a pipe coupling that is particularly useful in situations where an uncoupled pipe cannot readily be moved longitudinally for insertion into a slip joint or other type of traditional coupling.

BACKGROUND OF INVENTION

Various types of pipe couplings exist for coupling adjacent end pipes to each other including, for example, slip joints. When using a slip joint to join two end pipes, each end of the pipe to be coupled is inserted into the slip coupling and glued into place. Problems arise when the pipe ends are too close together to allow a slip joint to be slid over each pipe end. In such instances, one end of the pipe must be cut or bent to provide space enough to slide the slip joint over one end. After inserting the end pipe into the slip joint, the end pipe must then be bent back into place to slide the slip joint over the adjacent pipe and then glued into place. As the diameter of the pipe increases, more and more of the pipe must be exposed to facilitate the bending of the pipe. When pipes are buried or concealed, as is often the case, great effort and expense goes into the removal of dirt and debris to expose the necessary length of pipe.

The industry has also developed pipe couplings which telescope. These telescoping couplings allow someone to shorten the coupling, rather than cut or bend the pipe, to facilitate insertion of the pipe into the coupling. Although these telescoping couplings are an improvement over the slip couplings, the situations in which telescoping couplings can be used are limited. First, the telescoping couplings are rather long themselves in their shortest position, which may still require that the pipes be cut or bent. Second, the overall length to which they can be shortened and lengthened is fixed which limits their use to applications where the gap between adjacent pipes is within the telescoping range of the coupling.

Generally, telescoping couplings are manufactured to specific lengths and cannot be adjusted in length beyond the telescoping range for which a given telescoping coupling is manufactured. Essentially the telescoping couplings are only an improvement over the slip joints if the gap between pipe ends is more than the telescoping coupling's length when fully compressed, but less than the telescoping coupling's length when fully telescoped. These limitations require someone working in the industry to maintain a rather broad and expensive inventory of varying lengths and diameters to respond to a variety of circumstances.

Another problem with telescoping couplings is that they are expensive to manufacture because they typically consist of numerous and complex parts. In addition, certain high end slip joints, which incorporate rubber seals and threaded end parts designed to enable someone to adjust the position of the slip coupling over the pipe ends and then tighten down, are also expensive to manufacture.

Most pipe couplings which utilize rubber seals or o-rings to hold the coupling in position over a joint have problems with movement and leakage. Over time these rubber seals can move and/or deteriorate, causing leakage and necessitating repair or replacement of the coupling. Leakage can become a significant problem where the pipes are buried, making it necessary to dig up the pipe to replace the leaking couplings.

SUMMARY OF INVENTION

It is therefore an object of this invention to provide a pipe coupling which can be used to couple pipe ends without the need to cut or bend the pipes.

It is a further object of this invention to provide a pipe coupling which can be used in situations where there is a large gap between the pipe ends.

It is a further object of this invention to provide a pipe coupling which is less likely to leak than pipe couplings currently available in the industry.

It is a further object of this invention to provide a pipe coupling which is inexpensive to manufacture.

It is a further object of this invention to provide a pipe coupling which does not comprise numerous complex parts and is easy to install.

This invention features a pipe coupling comprising a first and second partial-sleeve, for coupling adjacent, uncoupled pipe ends. Each partial-sleeve has a longitudinal axis, and when each partial-sleeve is viewed cross-sectionally along the longitudinal axis, it has an inner surface in the shape of an arc. Each partial-sleeve has a first and second longitudinal edge defining the longitudinal arc parallel to each partial-sleeve's longitudinal axis. The inner surface of each first and second partial-sleeve is placed around and against the outer surface of the pipe ends so that the first and second longitudinal edges of the first partial-sleeve are proximate to the first and second longitudinal edges of the second partial-sleeve forming a first sleeve B around the pipe ends. The first sleeve overlaps the pipe ends in both longitudinal directions. When in place over the pipe, the first sleeve B has an inner diameter about equal to the outer diameter of the pipe ends. The first sleeve B may be fixed in position around the pipe by any number of means including hose clamps, electrical or any other type of adhesive tape, heat shrink tubing, a second sleeve, or plastic cement applied to the inside of the first sleeve and the outside of the pipe.

As mentioned above the invention may further include a second sleeve C comprising a third and fourth partial-sleeve each having a longitudinal axis. Each third and fourth partial-sleeve, when viewed cross-sectionally along the longitudinal axis, has an inner surface in the shape of an arc. Each partial-sleeve also has a third and fourth longitudinal edge defining the longitudinal arc parallel to said partial-sleeve's longitudinal axis. The inner surface of each third and fourth partial-sleeve is placed around and against the outer surface of the first sleeve B so that the third and fourth longitudinally edges of the third partial-sleeve are proximate to the third and fourth longitudinal edges of the fourth half-sleeve. Together the third and fourth partial-sleeves form a second sleeve C around said first sleeve B. When in place, the second sleeve C has an inner diameter about equal to the outer diameter of the first sleeve B. The second sleeve C may also be fixed in position around the first sleeve A by any number of means including plastic cement applied to the inside of the first sleeve and the outside of the pipe, a hose clamp, electrical or any other type of adhesive tape, heat shrink tubing, or a second sleeve.

A more specific embodiment of the invention includes a first and second partial-sleeve each of which has a first and second longitudinal notch defining the longitudinal arc parallel to said first and second partial-sleeve's longitudinal axis. The inner surface of each first and second partial-sleeve is placed around and against the outer surface of the pipe ends so that the first and second longitudinal notches of the first partial-sleeve are proximate to the first and second longitudinal notches, respectively, of the second partial-sleeve. As a result the first and second partial-sleeves together form a first sleeve around the pipe ends.

The more specific embodiment further includes a third and fourth partial-sleeve each of which has a third and fourth notch defining a longitudinal arch parallel to said third and fourth partial-sleeve's longitudinal axis. The inner surfaces of the first and second partial-sleeves are provided around and against the outer surface of said first sleeve so that the third and fourth notches of the first half-sleeve are proximate the corresponding third and fourth longitudinal notches of the second half-sleeve, together forming a second sleeve around said first sleeve. The second sleeve preferably has an inner diameter about equal to the outer diameter of said first sleeve.

The partial-sleeves of any sleeve may consist of or include a rigid plastic material.

The invention may be further used where the first and second edges or notches of the third and fourth partial-sleeves are held in position at 90 degrees to the first and second edges or notches of the first and second partial-sleeves.

A further specific embodiment of the invention includes overlapping the pipe ends at least about 1 inch with the first sleeve.

A further specific embodiment of the invention includes a third and fourth partial-sleeve each of which is about equal in length to the first and second partial-sleeves.

The invention further comprises a method for coupling adjacent uncoupled pipe ends which includes: applying a fixing means to the outside of the pipe ends and to the inside of two first and second partial-sleeves; then joining the first and second partial-sleeves each having a longitudinal axis, each, when viewed cross-sectionally along the longitudinal axis, has an inner surface in the shape of an arc, and each having a first and second longitudinal notch defining the longitudinal arc parallel to each partial-sleeve's longitudinal axis, so that the inner surfaces of the first and second partial-sleeves are provided around and against the outer surface of the pipe ends so that the first and second longitudinal notches of the first partial-sleeve are proximate the first and second longitudinal notches, respectively, of the second partial-sleeve, thus forming a first sleeve B around said pipe ends. The first sleeve generally overlaps the pipe ends in both longitudinal directions and the first sleeve B, when in position around the pipe ends, has an inner diameter about equal to the outer diameter of said pipe ends.

The method above further includes: applying a second fixing means to the outside of said first sleeve B and the inside of two third and fourth partial-sleeves; then joining the third and fourth partial-sleeves, each having a longitudinal axis, each, when viewed cross-sectionally along the longitudinal axis, has an inner surface in the shape of an arc, and each has a third and fourth notch defining the longitudinal arc parallel to each partial-sleeve's longitudinal axis, so that the inner surfaces of the first and second partial-sleeves are provided around and against the outer surface of the first sleeve B so that the third and fourth longitudinal notches of the first partial-sleeve is proximate to the third and fourth longitudinal notches respectively of the second partial-sleeve forming a second sleeve C around the first sleeve. The second sleeve C is about equal in length to the first sleeve B and said second sleeve C has an inner diameter about equal to the outer diameter of said first sleeve B. When in position, the third and fourth longitudinal notches are fixed at 90 degrees to said first and second longitudinal notches.

The method above further includes using a hose clamp, heat shrink tubing, an additional sleeve, plastic cement, or other fixing means to fix the first and second sleeves in position.

The method above further includes using a pipe coupling where the partial-sleeves consist of or include rigid plastic material.

It is envisioned that the invention will provide an inexpensive pipe coupling which consists of very few parts, is easy to assemble, and can be modified to fit a variety of circumstances.

To assemble one possible embodiment, a person could feasibly require only two lengths of pipe coupling material each resembling a partial-sleeve, some plastic cement, and a pipe cutter.

First, assuming the first length of partial-sleeving resembled a half-sleeve, or a 180 degree arc, two pieces of the partial-sleeving could be cut of equal length from a single length of pipe coupling material, each piece of sufficient length to overlap the pipe ends. Next, plastic cement is applied to the outside of the pipe ends and to the inside surface of the two partial-sleeving pieces. These first two partial-sleeving pieces are then centered and pressed over and under the pipe so that the pieces' longitudinal edges are proximate to each other forming a tube-like jacket around the pipe ends.

Second, assuming the second length of partial-sleeve resembled a half-sleeve, or a 180 degree arc, two pieces of the partial-sleeving could also be cut of equal length from a single length of pipe coupling material. The second length of partial-sleeving should have an inner radius of curvature equal to or greater than the inner radius of curvature of the first length of partial-sleeving. Then, plastic cement is applied to the outside surface of these pieces and to the inside surface of the remaining two partial-sleeving pieces. Finally, these remaining two partial-sleeving pieces are centered and pressed at 90 degrees to the first tube-like jacket onto the outer surface of the first tube-like jacket previously cemented to the pipe ends so that the remaining two partial-sleeving pieces' longitudinal edges are proximate to each other forming a second tube-like jacket around the first tube-like jacket.

Although the first tube-like jacket may be sufficient to seal the pipe ends, the second tube-like jacket, when positioned 90 degrees to the first jacket, serves to support the first jacket and to further seal the pipe joint.

BRIEF DESCRIPTION OF THE DRAWINGS

Other objects, features and advantages will occur to those skilled in the art from the following description of preferred embodiments and the accompanying drawings in which:

FIG. 1g is a perspective view of an embodiment of partial-sleeves 2, 2a, 14, and 14a.

DESCRIPTION OF THE PREFERRED EMBODIMENT

The pipe coupling of this invention enables a person to easily and inexpensively couple adjacent uncoupled pipe ends. The pipe coupling may be accomplished by any number of means, including one or more sleeves, each comprising two or more corresponding partial-sleeves, which may be fixed to the underlying pipe ends by plastic cement, an additional sleeve, a hose clamp, electrical or any other type of adhesive tape, or heat shrink tubing.

Figure 1:
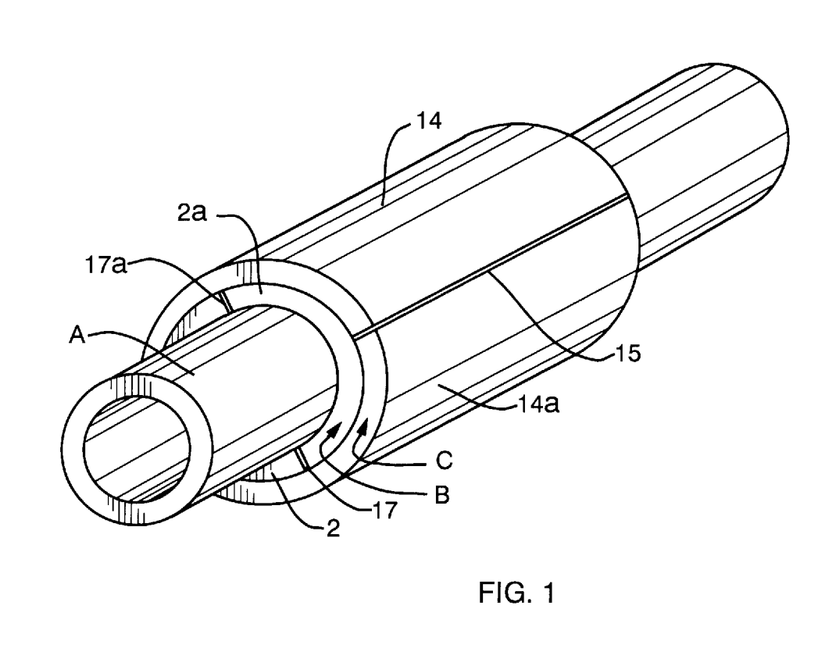
FIG. 1 is a perspective view of an embodiment of the pipe coupling of this invention.

FIG. 1 shows a preferred embodiment of the pipe coupling showing a second sleeve C assembled around the first sleeve B. A first sleeve B comprising two partial-sleeves, each partial-sleeve resembling a 180 degree arc, is glued around an underlying uncoupled pipe A so that together the partial-sleeves form the first pipe-like sleeve B around and proximate to the underlying pipe. A second sleeve C, comprising two partial-sleeves, each again resembling a 180 degree arc, has been glued around the underlying first sleeve to form a second pipe-like sleeve C around and proximate to the underlying first sleeve B.

Figure 1A:
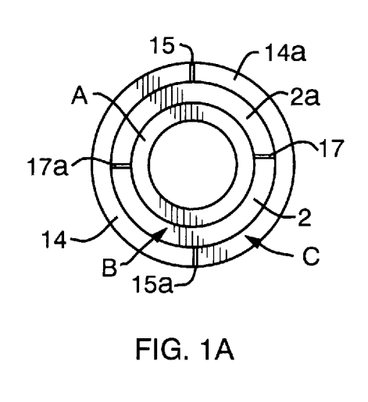
FIG. 1a is a cross-sectional view of the pipe coupling in FIG. 1.
Figures 1B, 1D:
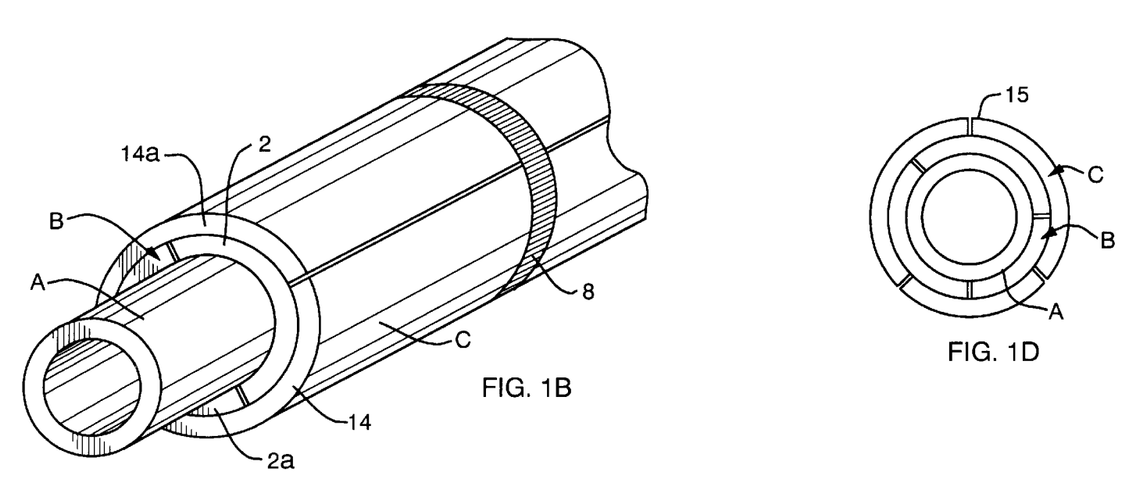
FIG. 1b is a perspective view of an embodiment of the pipe coupling shown in FIG. 1 showing an embodiment of the fixing means.
FIG. 1d is a cross-sectional view of an embodiment of a pipe coupling.

The second sleeve is glued so that its two longitudinal seams 15 and 15a are positioned 90 degrees to the longitudinal seams 17 and 17a of the underlying first sleeve B as shown in FIG. 1a. Positioning the second sleeve 90 degrees to the first sleeve seals off whatever gap may exist at the seams of the first sleeve. As the partial-sleeves are pressed onto each respective underlying layer, the adhesive is forced into whatever space exists in between the first sleeve B and the underlying pipe A, between the first sleeve B and second sleeve C, and between the edges of the partial-sleeves themselves as shown in FIG. 1h. Together with the adhesive, the first and second sleeves B and C provide a durable and inexpensive pipe coupling of pipe A.

Figure 1E:
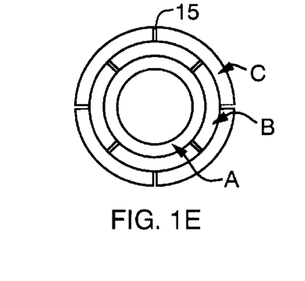
FIG. 1e is a cross-sectional view of an embodiment of a pipe coupling.
Figure 1G:
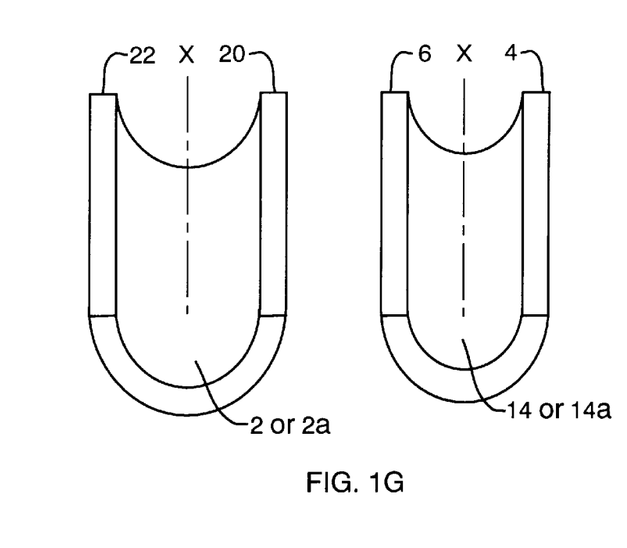
Figure 2:
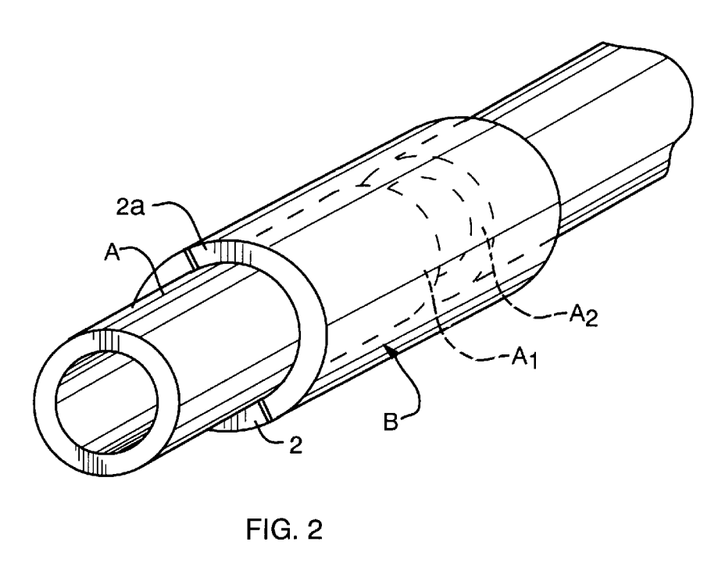
FIG. 2 is an perspective view of an embodiment of the pipe coupling.
Figure 2A:
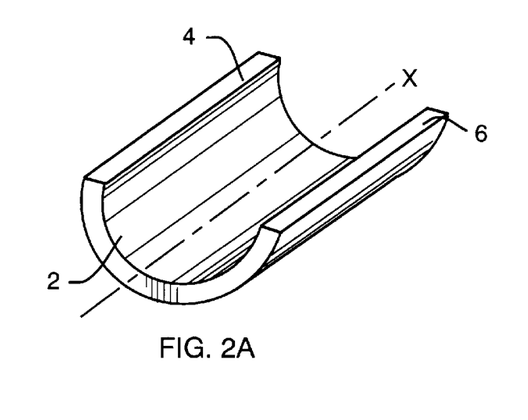
FIG. 2a is a perspective view of an embodiment of partial-sleeve 2.

More specifically, the pipe coupling shown in FIG. 1 embodies an assembled pipe coupling, comprising two sleeves B and C, a first sleeve B made up of partial-sleeves 2 and 2a, and a second sleeve C made up of partial-sleeves 14 and 14a. Each partial-sleeve has a longitudinal axis X as in FIG. 1g, and when each partial-sleeve is viewed cross-sectionally along longitudinal axis X, it has an inner surface in the shape of an arc. Each partial-sleeve has a first and second longitudinal edge, for example, edges 4, 6, 20 and 22 as shown in FIG. 1g, defining a longitudinal arc parallel to each partial-sleeve's longitudinal axis X. This invention contemplates any number of layered sleeves and that each sleeve may be comprised of two or more partial-sleeves as shown in FIGS. 1a, 1d, 1e, or 2e, the total arcs of which should approximate a 360 degree arc. FIG. 1a is a cross-sectional view of the pipe coupling in FIG. 1 showing seams 15 and 15a positioned at 90 degrees to seams 17 and 17a. FIGS. 1d, 1e, and 2e are cross-sectional views of an embodiment of a pipe coupling, showing each sleeve as comprising more than two partial-sleeves.

Figure 1C:
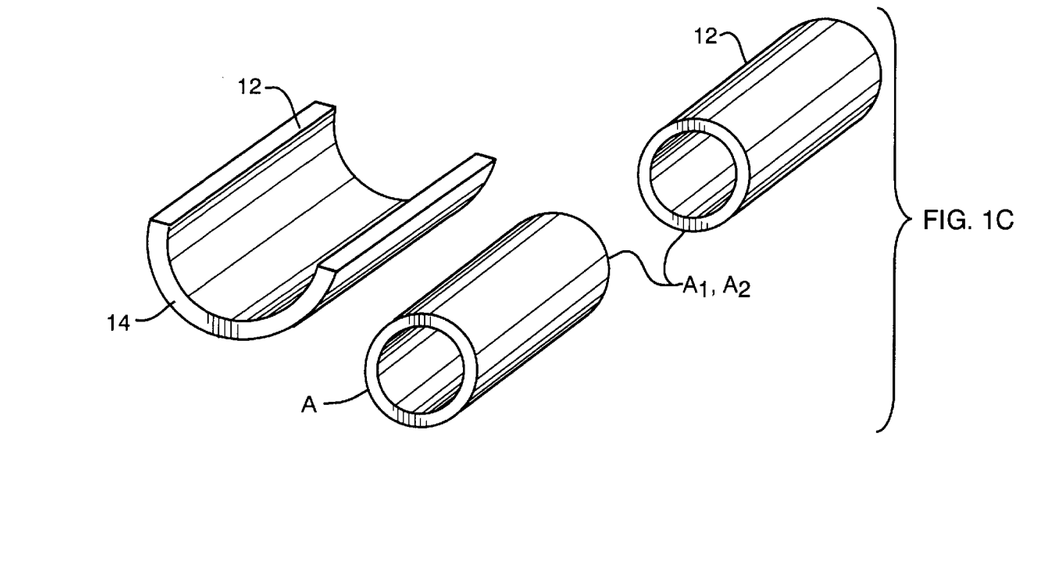
FIG. 1c is a perspective view of an embodiment of partial-sleeve 14 and pipe A, both shown in FIG. 1, showing an embodiment of the fixing means.
Figure 2B:
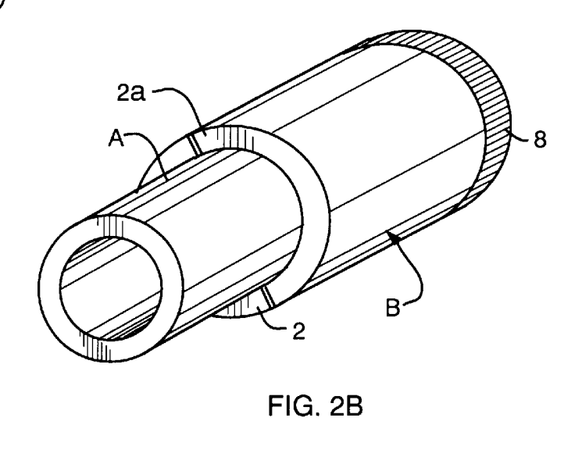
FIG. 2b is a perspective view an embodiment of the pipe coupling, showing one embodiment of the first fixing means.
Figure 2C:
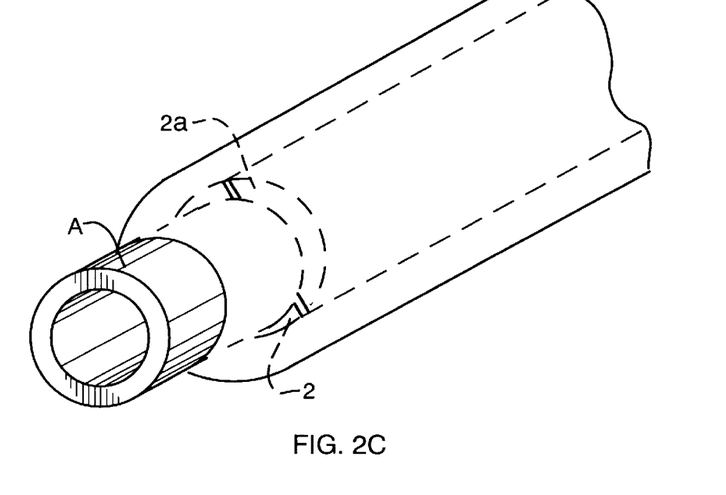
FIG. 2c is a perspective view of an embodiment of the pipe coupling, showing one embodiment of the first fixing means.
Figure 2D:
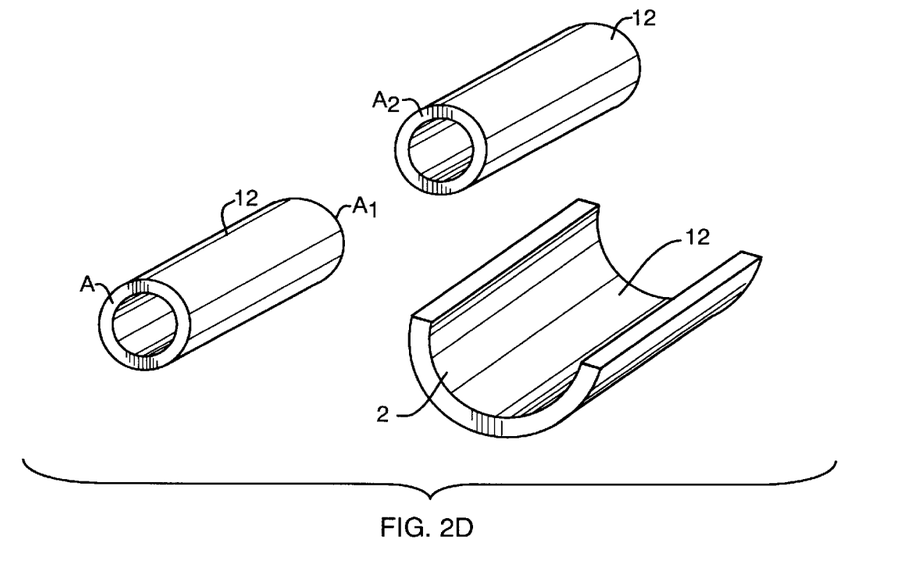
FIG. 2d is a view of an embodiment of partial-sleeve 2 and pipe A, showing an embodiment of the first fixing means.
Figure 2E:
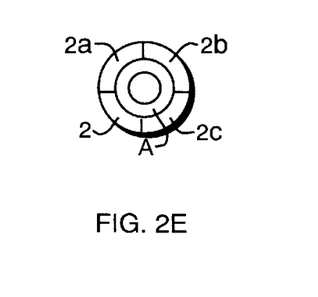
FIG. 2e is a cross-sectional view of an embodiment of the pipe coupling.

This invention also contemplates any number of means for fixing each sleeve to the underlying pipe and/or underlying sleeve, including plastic cement applied to the outside of the underlying pipe and/or sleeve and applied to the inside of each partial-sleeve making up the overlying sleeve, as shown in FIGS. 1c and 2d, hose clamps, as shown in FIGS. 1b and 2b, heat shrink tubing, as shown in FIG. 2c, electrical tape, or any other type of adhesive tape.

This invention contemplates partial-sleeves comprising any number of durable materials, but the preferred material is a rigid plastic shaped by a molding or extruding process. Any inner diameter or radius of curvature size may be manufactured by simply changing extrusion dies. The partial-sleeves may be cut to any length, predetermined or on site as needed.

To assemble, each partial-sleeve making up the first sleeve B should be cut to a length so that the combined first sleeve B will, when assembled and fixed to the underlying pipe A, overlap the pipe ends A1 and A2, as shown in FIG. 2 which shows an embodiment of the pipe coupling assembled two pipe ends showing only a first sleeve made up of two partial-sleeves 2 and 2a, each in the shape of a 180 degree arc. This invention contemplates coupling adjacent pipe ends having virtually any size gap between the pipe ends, but the preferred embodiment of the pipe coupling should overlap each pipe end by at least about 1–1.5 inches.

After sizing and cutting the partial sleeves, the first sleeve B is assembled by applying a plastic cement to the outside of the underlying pipe A and to the inside of each partial-sleeve as shown in FIG. 2d. It is envisioned that the plastic cement could serve both as a means for fixing the first sleeve B in position around the underlying pipe A and as a sealant between the first sleeve B and the underlying pipe A and between the edges of the partial-sleeves of the first sleeve B as shown in FIG 1h. The partial-sleeves are than pressed onto the underlying pipe A so that the corresponding edges of each partial-sleeve are proximate to the corresponding edges of the respective adjacent partial-sleeves to produce, when combined, a 360 degree tube-like sleeve B surrounding the underlying pipe ends as in FIG. 2. The first sleeve B preferably should have an inner radius of curvature about equal to the outer radius of curvature of the underlying pipe A.

A second or additional sleeves may also be applied. The second sleeve C shown in FIG. 1 may serve to, further seal up the pipe joint, provide additional support to the first sleeve B, and fix the first sleeve B in position. The use of the term sleeve is not intended to limit the shape of any layer applied over the first sleeve B. The invention contemplates any number of embodiments to serve as a fixing, supporting, or sealing means to the first layer, including partial or full-sleeves, stationary patches, plastic sealants, hose clamps, rings, electrical tape, other adhesive tapes, or shrink tube.

The second sleeve C, shown in FIG. 1, may comprise any number of partial-sleeves as in the first sleeve B, and may be fixed to the underlying first sleeve B in the same manner as described above using plastic cement. The second sleeve C preferably has an inner radius of curvature about equal to the outer radius of curvature of the first sleeve B.

Figure 1F:
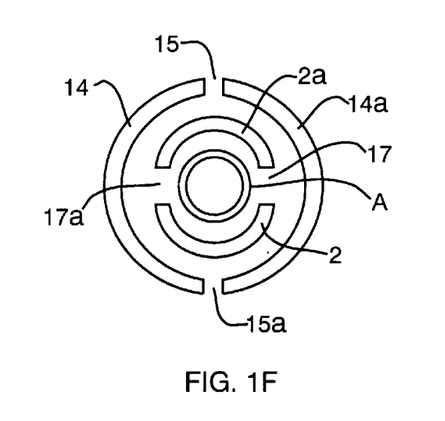
FIG. 1f is an exploded view of the embodiment of the pipe coupling of FIG. 1.
Figure 1H:
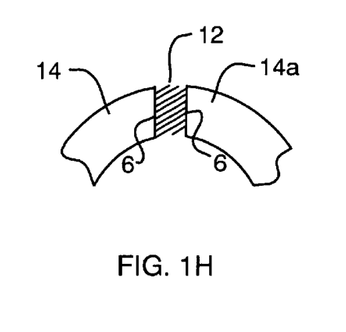
FIG. 1h is an enlarged view of an embodiment of seam 15.

The second sleeve C should preferably be positioned so that the seams of the second sleeve C line up about equidistant between the seams of the first sleeve B. For example, as shown in FIGS. 1, 1a, and 1f, when both the first and second sleeves are each comprised of two partial-sleeves, 2 and 2a, and 14 and 14a, respectively, the two seams 15 and 15a of the second sleeve, located at the point where the two partial-sleeves 14 and 14a meet, should be positioned 90 degrees to the seams 17 and 17a of the first sleeve, located at the point where the two partial-sleeves 2 and 2a meet.

Figure 3:
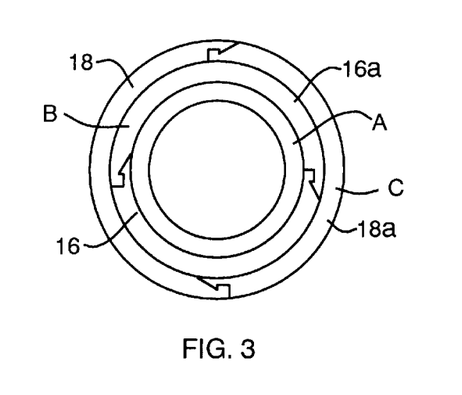
FIG. 3 is a cross-sectional view of an assembled embodiment of the pipe coupling.
Figure 3A:
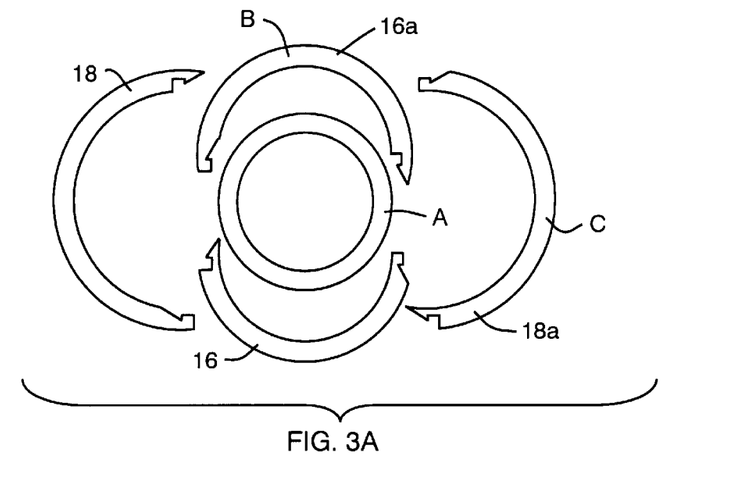
FIG. 3a is an exploded view of FIG. 3.

FIGS. 3 and 3a detail an embodiment of a pipe coupling in which the partial-sleeves, 16 and 16a of the first sleeve B and 18 and 18a of the second sleeve C, include notches located along longitudinal edges 4, 6, 20, and 22, shown in FIG. 1g. The notches serve as a means for connecting the partial-sleeves of each sleeve together to form a continuous sleeve around the underlying pipe or sleeve. In the embodiment shown in FIGS. 3 and 3a, the partial-sleeves would be snapped together.

The notch configuration shown in FIGS. 3 and 3a is not meant to limit the possible configurations contemplated by the invention to be used to join the partial-sleeves together, which may include any number of interconnecting parts or shapes which can be snapped, pressed, or glued together. The notches can be formed during the molding or extruding process or on site with tool. The invention contemplates any number of notches or joining means, including a continuous notch or continuous means, located along the edge or outer surface of the partial-sleeves.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A pipe coupling for coupling adjacent, uncoupled pipe ends, comprising, first and second partial-sleeves each having a longitudinal axis, wherein each said first and second partial-sleeve when viewed cross-sectionally along the longitudinal axis has an inner surface in the shape of an arc, wherein each said partial-sleeve has a first and second longitudinal edge defining a longitudinal arc parallel to said partial-sleeve's longitudinal axis, wherein said inner surfaces of said first and second partial-sleeves are provided around and against the outer surface of said pipe ends so that said first and second longitudinal edges of the first partial-sleeve are proximate to the first and second longitudinal edges of the second partial-sleeve forming a first sleeve around said pipe ends, wherein said first sleeve overlaps in both longitudinal directions said pipe ends, wherein said first sleeve has an inner radius of curvature about equal to the outer radius of curvature of said pipe ends;

a third and fourth partial-sleeve each having a longitudinal axis, wherein each said third and fourth partial-sleeve when viewed cross-sectionally along the longitudinal axis has an inner surface in the shape of an arc, wherein each said partial-sleeve has a third and fourth longitudinal edge defining a longitudinal arc parallel to said partial-sleeve's longitudinal axis, wherein said inner surfaces of said third and fourth partial-sleeves are provided around and against the outer surface of said first sleeve so that said third and fourth longitudinal edges of the third partial-sleeve are proximate to the third and fourth longitudinal edges of the fourth half-sleeve forming a second sleeve around said first sleeve, wherein said second sleeve overlaps in both longitudinal directions said pipe ends, and wherein said second sleeve has an inner radius of curvature about equal to the outer radius of curvature of said first sleeve; and a first fixing means for holding said second sleeve in position around and against said first sleeve.

2. A pipe coupling in claim 1, wherein the first fixing means includes a plastic cement.

3. A pipe coupling in claim 1, wherein said partial-sleeves include a rigid plastic material.

4. The pipe coupling in claim 1, wherein said first and second longitudinal edges of said third and fourth partial-sleeves are held in position at 90 degrees to said first and second longitudinal edges of said first and second partial-sleeves by said first fixing means.

5. The pipe coupling in claim 1 for coupling adjacent, uncoupled pipe ends, wherein said first sleeve extends at least about 1 inch in both longitudinal directions from said pipe ends.

6. A pipe coupling for coupling adjacent, uncoupled pipe ends, comprising, first and second partial-sleeves each having a longitudinal axis, wherein each said first and second partial-sleeve when viewed cross-sectionally along the longitudinal axis has an inner surface in the shape of an arc, wherein each said first and second partial-sleeve has a first and second notch defining a arc parallel to said first and second partial-sleeve's longitudinal axis, wherein said inner surfaces of said first and second partial-sleeves are provided around and against the outer surface of said pipe ends so that said first and second notches of the first partial-sleeve are proximate to the first and second notches respectively of the second partial-sleeve forming a first sleeve around said pipe ends, wherein said first sleeve overlaps in both longitudinal directions said pipe ends, wherein said first sleeve has an inner radius of curvature about equal to the outer radius of curvature of said pipe ends;

a first fixing means for holding said first sleeve in position around and against said pipe ends;

third and fourth partial-sleeves each having a longitudinal axis, wherein each said third and fourth partial-sleeve when viewed cross-sectionally along the longitudinal axis has an inner surface in the shape of an arc, wherein each said third and fourth partial-sleeve has a third and fourth notch defining an arc parallel to said third and fourth partial-sleeve's longitudinal axis, wherein said inner surfaces of said first and second partial-sleeves are provided around and against the outer surface of said first sleeve so that said third and fourth notches of the first half-sleeve are proximate the third and fourth notches respectively of the second half-sleeve forming a second sleeve around said first sleeve, wherein said second sleeve overlaps in both longitudinal directions said pipe ends, and wherein said second sleeve has an inner radius of curvature about equal to the outer radius of curvature of said first sleeve; and a second fixing means for holding said second sleeve in position around and against said first sleeve.

7. The pipe coupling in claim 6 for coupling adjacent, uncoupled pipe ends, wherein said first sleeve extends at least about 1 inch in both longitudinal directions from said pipe ends.

8. The pipe coupling in claim 6 for coupling adjacent uncoupled pipe ends, wherein said first and second fixing means includes a plastic cement.

9. The pipe coupling in claim 6 for coupling adjacent uncoupled pipe ends, wherein said first, second, third, and fourth partial-sleeves include a rigid plastic material.

10. The pipe coupling in claim 6 for coupling adjacent uncoupled pipe ends, where said third and fourth partial-sleeves ar about equal in length to said first and second partial-sleeves.

11. The pipe coupling in claim 6 for coupling adjacent uncoupled pipe ends, wherein said third and fourth notches of said third and fourth partial-sleeves are held in position at 90 degrees to said first and second notches of said first and second partial-sleeves by a second fixing means.

12. A method for coupling adjacent uncoupled pipe ends, comprising, applying a first fixing means to the outside of said pipe ends and to the inside of two first and second partial-sleeves;

joining said first and second partial-sleeves each having a longitudinal axis, wherein each said first and second partial-sleeve when viewed cross-sectionally along the longitudinal axis has an inner surface in the shape of an arc, wherein each said first and second partial-sleeve has a first and second notch defining an arc parallel to said first and second partial-sleeve's longitudinal axis, so that said inner surfaces of said first and second partial-sleeves are provided around and against the outer surface of said pipe ends so that said first and second notches of the first partial-sleeve are proximate the first and second notches respectively of the second partial-sleeve forming a first sleeve around said pipe ends, wherein said first sleeve overlaps in both longitudinal directions said pipe ends, and wherein said first sleeve has an inner diameter about equal to the outer diameter of said pipe ends;

applying a second fixing means to the outside of said first sleeve and the inside of two third and fourth partial-sleeves; and joining said third and fourth partial-sleeves each having a longitudinal axis, wherein each said third and fourth partial-sleeve when viewed cross-sectionally along the longitudinal axis has an inner surface in the shape of an arc, wherein each said third and fourth partial-sleeve has a third and fourth notch defining a arc parallel to said third and fourth partial-sleeve's longitudinal axis, so that said inner surfaces of said first and second partial-sleeves are provided around and against the outer surface of said first sleeve so that said third and fourth notches of the first partial-sleeve is proximate the third and fourth notches respectively of the second partial-sleeve forming a second sleeve around said first sleeve, wherein said second sleeve overlaps in both longitudinal directions said pipe ends, wherein said second sleeve has an inner diameter about equal to the outer diameter of said first sleeve, and wherein said third and fourth notches are fixed at 90 degrees to said first and second longitudinal.

13. The method for coupling adjacent uncoupled pipe ends in claim 12, wherein said first and second fixing means include plastic cement.

14. The method for coupling adjacent uncoupled pipe ends in claim 12, wherein said first, second, third, and fourth partial-sleeves include rigid plastic material.

\* \* \* \* \*